United States Patent [19]

Landgraf

[11] Patent Number: 5,235,751
[45] Date of Patent: Aug. 17, 1993

[54] CAR EMBLEM REMOVER

[76] Inventor: Scott A. Landgraf, 4618 S. Lake Sarah Dr., Maple Plain, Minn. 55359

[21] Appl. No.: 850,295

[22] Filed: Mar. 12, 1992

[51] Int. Cl.⁵ .............................................. B26B 3/00
[52] U.S. Cl. ....................................... 30/169; 30/280; 156/584
[58] Field of Search ................. 30/169, 329, 278, 280, 30/478; 15/236.01; D32/48; 156/584

[56] References Cited

U.S. PATENT DOCUMENTS

| | | | |
|---|---|---|---|
| 972,225 | 10/1910 | Pennell | 30/169 |
| 1,726,017 | 8/1929 | Des Enfants, Sr. | D32/48 |
| 1,910,087 | 5/1933 | Charlton | D32/48 |
| 2,839,109 | 6/1958 | Wilson et al. | 30/478 |
| 3,078,572 | 2/1963 | Everton | 30/169 |
| 4,589,209 | 5/1986 | Zarges et al. | 30/478 |
| 4,955,138 | 9/1990 | Henke et al. | 30/169 |
| 5,022,951 | 6/1991 | Behlmer et al. | 156/584 |

Primary Examiner—Douglas D. Watts
Assistant Examiner—Hwei-Siu Payer
Attorney, Agent, or Firm—James W. Miller

[57] ABSTRACT

A car emblem remover for cleaning removing car emblems from a car to preserve both the car emblem and the painted surface of the car. Features of the car emblem remover include paper-thin spacers to space the cutting edge of the blade from the painted car surface, a tubular-like handle for receiving and shielding the car emblem being removed, an inclined inner surface to slowly lift the emblem from the car, and slightly raised bottom runners to account for curvature of the painted car surface.

7 Claims, 2 Drawing Sheets

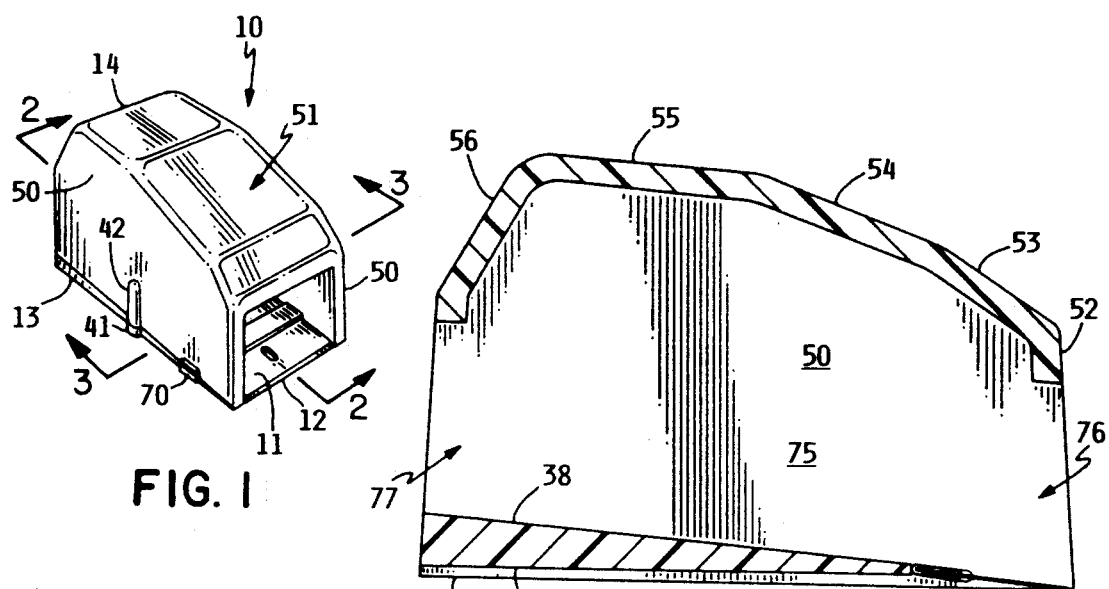
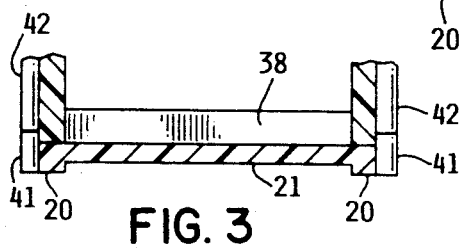
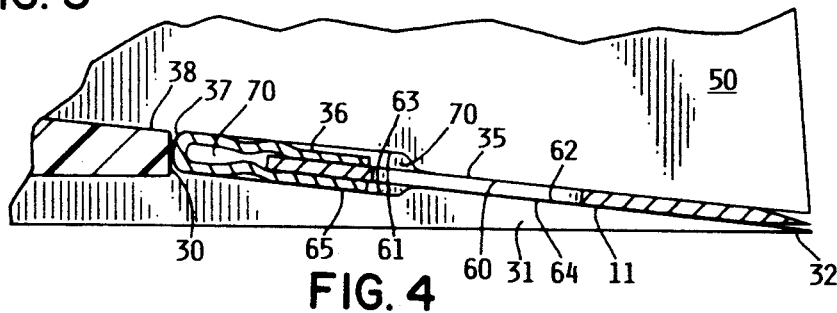
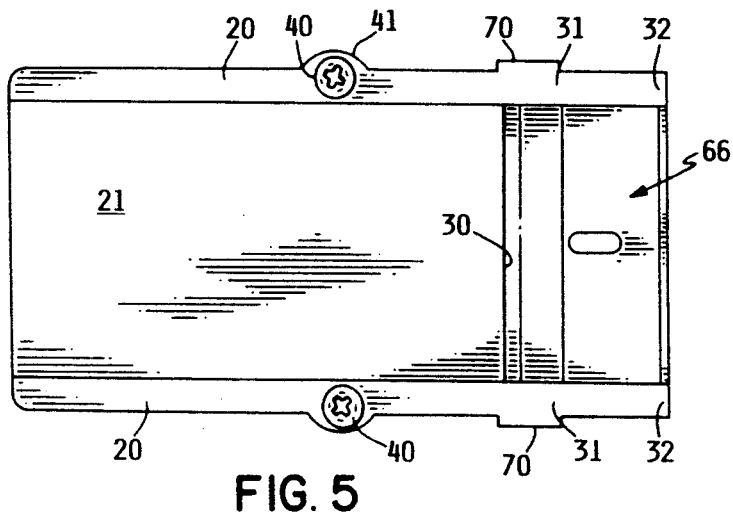

CAR EMBLEM REMOVER

BACKGROUND OF THE INVENTION

The present invention relates to a tool for removing an object affixed to a surface and, more particularly, to removing a car emblem from the painted surface of a car.

A car emblem is a decorative strip affixed on the painted surface of a car. One type of car emblem spells out the particular model of a car such as BONNEVILLE. Another type of car emblem is an elongate strip of metal and/or plastic affixed in such an orientation as to provide streamlining for the car. These emblems typically include a resilient backing which is affixed, such as by gluing, to the painted surface of a car.

Prior to painting a car, it is desirable that such emblems be removed. Typically, such emblems are removed with a putty knife by inserting the edge of the putty knife between the backing and the painted surface of the car.

The putty knife removal method is problematic. First, the putty knife scrapes the painted surface, thereby requiring the damaged surface to be sanded or otherwise prepped for painting. Second, the putty knife destroys the backing of the emblem, which typically requires the purchase of a new emblem for attachment after painting. Third, even if the backing somehow remains intact, the emblem frequently snaps in two or, especially in the case of the elongate streamlining strips, the emblem is permanently coiled or bent out of shape.

SUMMARY OF THE INVENTION

A feature of the invention is the provision in a car emblem remover, of a paper-thin spacer for the cutting edge of the blade of the remover for spacing the cutting edge from the painted surface of the car to minimize damage to the painted surface.

Another feature is the provision in such a car emblem remover, of the paper-thin spacers being disposed under side portions of the blade.

Another feature is the provision in such a car emblem remover, of the blade being mounted between base feet of a base portion of the remover with the base feet defining an open area therebetween to permit the blade to flex.

Another feature is the provision in such a car emblem remover, of the blade being disposed at relatively low angle of incidence relative to a bottom portion of the base to slowly lift the emblem off of the painted surface to minimize a permanent bending of the emblem.

Another feature is the provision in such a car emblem remover, of a handle disposed over the blade to define a shielded passage for receiving the emblem being removed and for shielding the emblem from breakage.

Another feature is the provision in such a car emblem remover, of the base portion including a bottom surface for engaging the painted surface of a car, and the lower surface including relief portions such as runners to account for curvature of the painted surface of the car.

Another feature of the present invention is the provision in a method for removing a car emblem from the painted surface of a car, of the steps of slicing between the backing of the car emblem and the painted surface of the car, and the step of spacing at least a portion of the cutting edge from the painted surface of the car by about the thickness of a sheet of paper during the step of slicing to minimize damage to the painted surface.

An advantage of the present invention is that a car emblem is removed cleanly from its respective painted car surface. The resulting exposed car surface is then typically ready to paint with minimal sanding or prepping. Moreover, the backing of the car emblem is left intact so that the car emblem may be reattached after the car has been painted. Still further, breakage or permanent bending of the car emblem is minimized.

Another advantage is that the present car emblem remover is simple and inexpensive to fabricate. The present car emblem remover is injection molded.

Another advantage is that the present car emblem remover is simple to operate.

BRIEF DESCRIPTION OF THE DRAWINGS

FIG. 1 is a perspective view of the present car emblem remover.

FIG. 2 is a section view at lines 2—2 of FIG. 1.

FIG. 3 is a section view at lines 3—3 of FIG. 1.

FIG. 4 is a detail view of a portion of FIG. 2 showing the paper-thin spacer for the cutting edge of the blade.

FIG. 5 is a bottom plan view of the car emblem remover of FIG. 1.

DETAILED DESCRIPTION OF THE PREFERRED EMBODIMENTS

Figure 6:
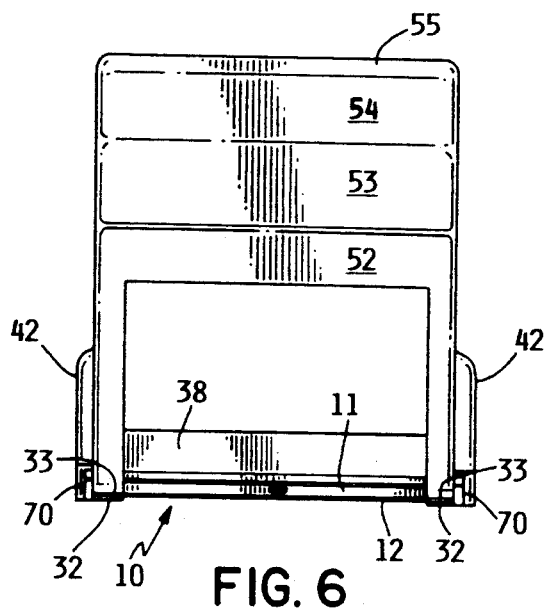
FIG. 6 is a front elevation view of the car emblem remover of FIG. 1.

As shown in FIG. 1, the present car emblem remover is indicated in general by the reference number numeral 10 and includes as its principal components a blade portion 11 with a cutting edge 12, a base portion 13 and a handle 14. The car emblem remover 10 removes car emblems such as the type shown in FIGS. 7, 8 by respective reference numerals 15, 16.

With more specificity, the base portion 13 includes a pair of elongate side runners 20 extending parallel to and transversely of each other. The runners 20 are raised about 0.0004–0.0005 inches above a lower middle portion 21 of the base portion 13 to account for the curvature typically found on the body panels of cars such that the cutting edge 12 may slice more closely to the painted surface of a car yet be spaced from the car surface and from the glue or adhesive which may remain on the car surface after the emblem has been removed from the car surface. Such glue may undesirably create friction between the base portion 13 and the car surface. It should be noted that the difference in altitude between the runners 20 and base middle portion 21 is greatly exaggerated in FIG. 2 and 3.

The runners 20 project forwardly of a front edge 30 of the base middle portion 21 to form a pair of base feet 31. At their front ends, the base feet 31 form paper-thin spacers 32 having a thickness of about 0.005 inches. The paper-thin spacers 32 are disposed immediately below side portions 33 of the blade 11 to space the cutting edge 12 of the blade 11 from the painted surface of a car.

It should be noted that the base feet 31 and base middle portion 21 are triangular in section to provide an inclined upper surface for slowly lifting or drawing the car emblem away from the painted surface of the car after the cutting edge 12 has sliced between the car emblem and the painted surface. The blade 11 is typically disposed at about a 5½ degree angle relative to the runners 20, but may be disposed at a 5°–20° angle. Such an inclined upper surface is provided by an upper surface 35 of the blade 11, an upper surface 36 of a rigid backing strip or clamp or rib 37 for the blade 11, and an upper interior surface 38 of the base middle portion 21. It should be noted that the blade 11 may be disposed to lie parallel to the oar surface; however such a horizontal blade may flex or walk up and down and undesirably scrape the car surface and pit the backing of the car emblem.

The base portion 13 is affixed to the handle 14 via threaded pin connectors 40. The pin connectors 40 engage molded threaded pin receptors 41, 42 molded into the base portion 13 and handle 14, respectively. The molded threaded pin receptor 41 formed in the base portion 13 includes a recessed portion for the heads of the pin connectors 40 such that the heads of the pin connectors are disposed at a higher altitude than the lower surfaces of the runners 20. Accordingly, the heads of the pin connectors 40 do not engage or scrape the painted surface of a car.

The handle 14 includes a pair of sidewalls 50 and a ceiling 51 extending between the sidewalls 50. The ceiling 51 includes five integral ceiling panels or portions 52, 53, 54, 55, 56, to provide an ergonomic grip or handle for the finger or hand to guide the car emblem remover 10 during the removal of a car emblem.

The sidewalls 50 include lower edges 60, 61 for engaging the upper surface 35 of the blade 11 and the upper surface 36 of the rigid blade strip 37, respectively. The base feet 31 include upper edges 62, 63 for engaging a lower surface 64 of the blade 11 and a lower surface 65 of the rigid blade strip 37, respectively. Accordingly, the blade 11 is pinched between the base feet 31 and sidewalls 50 to minimize generally vertical movement of the blade 11. However, it should be noted that an open area 66, defined by the area between the base feet 31 and forwardly of the front edge 30 of the base middle portion 21, permits the blade 11 to resiliently flex to respond to the slightly curved body panels or painted surfaces of a car.

The sidewalls 50 further include respective blade stops 70 extending downwardly and exteriorly of the lower edges 61 of the sidewalls 50. Such blade stops 70 engage the ends of the rigid strip 36 to minimize side-to-side movement of the blade 11. It should be noted the amount of protrusion of such stops 70 from the sidewalls 50 is exaggerated. The amount of such protrusion may be quite small.

It should be noted that the rigid blade strip 37 engages the front edge 30 of the base middle portion 21 to minimize backwards movement of the blade 11.

It should further noted that the base portion 13, the blade 11, the sidewalls 50, and ceiling 51 form an opening or passage 75 for receiving the car emblem being removed. The opening 75 includes a front portion 76 and a rear portion 77. Such an opening 75 is formed largely by the handle 14 and permits the handle 14 to act like a shield or protector for the car emblem to minimize breakage to the car emblem by, for example, a slip of the hand as the car emblem is being removed.

Figure 7:
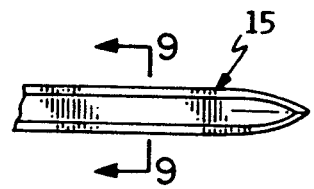
FIG. 7 is an elevation, partial view of one type of car emblem.
Figure 9:
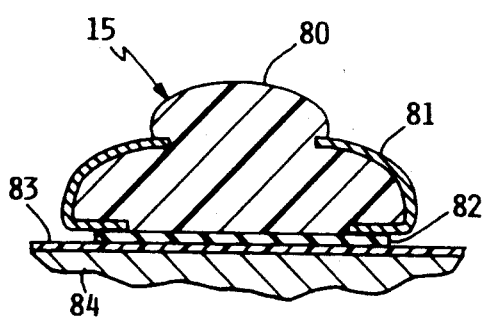
FIG. 9 is a section view at lines 9—9 of FIG. 7.

As shown in FIGS. 7 and 9, the streamlining or side molding type of car emblem 15 includes a plastic, perhaps colored, strip 80. A metal, typically aluminum, strip 81 is pinched onto the plastic strip 80. This metal strip 81 is typically permanently bent to a non-reusable condition when the emblem 15 is removed in a harsh fashion, such as by a putty knife; this metal strip 81 typically coils up to a non-reusable condition. A resilient backing 82 affixed to the strips 80, 81 is typically affixed, such as by an adhesive, to the painted surface of a car. This resilient, cushion-like, rubber or rubber-like backing 82 is typically destroyed when the emblem 15 is removed by a putty knife, with some of the backing 82 remaining on the car and some remaining on the emblem 15. Typically, any backing 82 remaining on the emblem 15 is pitted so that, even if the emblem 15 was prevented from coiling, the pitted emblem 15 is typically not re-used.

Figure 8:
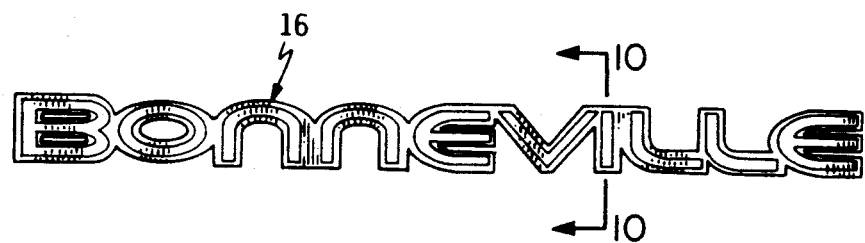
FIG. 8 is an elevation view of another type of car emblem.
Figure 10:
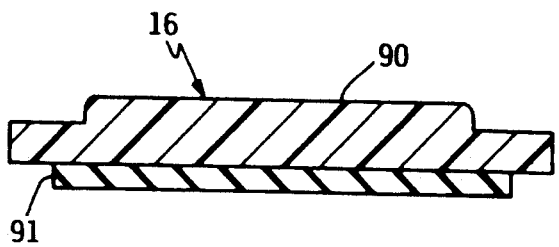
FIG. 10 is a section at lines 10—10 of FIG. 8.

As shown in FIGS. 8 and 10, the car emblem 16 spells out the model BONNEVILLE. It includes a plastic upper portion 90, and a resilient cushion-like lower backing 91 which is affixed, such as by an adhesive, to the painted surface of a car. Like backing 82, the backing 91 is destroyed by removing the car emblem 16 with a putty knife.

In operation, the cutting edge 12 is positioned at the end of a car emblem with the runners 20 and paper-thin spacers 32 engaging the painted surface of the car. The handle 14 is then manipulated to push the cutting edge 12 between the backing of the car emblem and the painted surface of the car with the cutting edge 12 disposed a fraction of an inch from the painted surface by the paper-thin spacers 32. As the cutting edge 12 slices immediately above the painted surface, the car emblem is drawn slowly away from the painted surface by the inclined blade 11 and upper surface 38 so as to prevent breakage or a coiling of the car emblem and so as to minimize a peeling or pitting of the resilient backing of the emblem. As the emblem is received in the opening 75, the emblem is shielded from breakage by the handle 14. The relatively long length of the opening or tunnel 75 further minimizes the chance that the emblem might coil. As the emblem exits opening portion 77, it is spaced sufficiently from the painted surface to be steadied by the other hand of the person operating the remover 10 until the cutting edge 12 has cut the emblem cleanly away from the painted surface. Such an operation preserves the cushion-like car emblem backing which is left in an unpitted state with a smooth face for re-attachment after the car has been painted. Such a method also preserves the painted surface of the car to minimize prepping steps for painting the car.

It should be noted that the blade 11 is easily replaceable. The pin connectors 40 are simply turned to separate the base portion 13 from the handle 14 to remove the blade 11 for replacement with another blade.

It should further be noted that the width of the car emblem remover 10 and the attendant width of the blade 11 and cutting edge 12, which presently is approximately the width of a conventional razor blade such as that used for shaving, may be increased to handle wider car emblems.

It should be further noted that the paper-thin spacers 32, shown to be integral with the base portion 13, may be formed as integral side portions of the blade 11.

It should be further noted that the present remover 10 may remove striping from cars, such as the pressure sensitive adhesive striping.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A car emblem remover for cleanly removing an emblem from the painted surface of a car, comprising:
   (a) a base portion for engaging the painted surface of the car;
   (b) a blade portion extending from the base portion and having a cutting edge for cutting between the emblem and the painted surface of the car for removing the emblem from the car, wherein the blade portion includes a pair of side portions that are generally parallel to one another and which are transversely spaced from one another with the cutting edge extending between the side portions; and
   (c) a paper-thin spacer means extending from the base portion and disposed adjacent to and below the cutting edge of the blade portion for spacing the cutting edge of the blade portion from the painted surface of the car to minimize damage to the painted surface, wherein the base portion includes a pair of forwardly extending base feet extending adjacent to and below the side portions of the blade portion, the base feet further having respective front ends, wherein the base feet carry said paper-thin spacer means adjacent said front ends thereof located proximate to and below the cutting edge of the blade portion.

2. The car emblem remover of claim 1, wherein the blade portion is resilient, the blade portion being biased toward a planar form and being flexible into a curved form.

3. The car emblem remover of claim 1, wherein the base feet define an open area therebetween to permit the blade portion to flex.

4. A car emblem remover for cleanly removing an emblem from the painted surface of a car, comprising:
   (a) a base portion for engaging the painted surface of the car, wherein the base portion includes a pair of side sections that are transversely spaced apart from one another;
   (b) a blade portion extending from the base portion and having a cutting edge for cutting between the emblem and the painted surface of the car for removing the emblem from the car; and
   (c) a handle extending from the side sections of the base portion, wherein the handle comprises a pair of sidewall portions extending from the side sections and a ceiling portion extending between the sidewall portions such that the user can grip the sidewall portions with the user's hand at least partially overlying the ceiling portion, the base portion, sidewall and ceiling portions forming a shielded passage for receiving the emblem being removed and for shielding the emblem from breakage by the hand on the handle.

5. The car emblem remover of claim 4, further including a paper-thin spacer means disposed adjacent to and below the cutting edge of the blade portion for spacing the cutting edge of the blade portion from the painted surface of the car to minimize damage to the painted surface.

6. A car emblem remover for cleanly removing an emblem from the painted surface of a car, comprising:
   (a) a base portion for engaging the painted surface of the car;
   (b) a blade portion extending from the base portion and having a cutting edge for cutting between the emblem and the painted surface of the car for removing the emblem from the car; and
   (c) the base portion including a pair of elongate side runners that are generally parallel to each other and extend parallel to a direction of travel of the blade portion, and the base portion further including a middle portion between the side runners, each of the side runners and middle portion having a lower surface, the lower surface of the middle portion being offset relative to the lower surfaces of the side runners to account for curvature of the painted surface of the car.

7. The car emblem remover of claim 6, further including a paper-thin spacer means disposed adjacent to and below the cutting edge of the blade portion for spacing the cutting edge of the blade portion from the painted surface of the car to minimize damage to the painted surface.

* * * * *